United States Patent
Storfer et al.

(10) Patent No.: US 9,489,780 B2
(45) Date of Patent: Nov. 8, 2016

(54) METHOD FOR PROCESSING DATA

(71) Applicant: AVL LIST GMBH, Graz (AT)

(72) Inventors: Gerhard Storfer, Wolfsberg (AT);
Stefan Thamerl, Graz (AT); Nikolas Schuch, Güttenbach (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 14/405,637

(22) PCT Filed: Jun. 7, 2013

(86) PCT No.: PCT/EP2013/061796
§ 371 (c)(1),
(2) Date: Dec. 4, 2014

(87) PCT Pub. No.: WO2013/182681
PCT Pub. Date: Dec. 12, 2013

(65) Prior Publication Data
US 2015/0154817 A1 Jun. 4, 2015

(30) Foreign Application Priority Data
Jun. 8, 2012 (AT) ............ A 50225/2012

(51) Int. Cl.
*G01N 17/00* (2006.01)
*G06F 7/00* (2006.01)
*G07C 5/00* (2006.01)
*G07C 5/08* (2006.01)
*G01F 25/00* (2006.01)

(52) U.S. Cl.
CPC ............ *G07C 5/08* (2013.01); *G01F 25/00* (2013.01); *B60W 2530/14* (2013.01)

(58) Field of Classification Search
CPC combination set(s) only.
See application file for complete search history.

(56) References Cited

U.S. PATENT DOCUMENTS

| | | |
|---|---|---|
| 2007/0265805 A1 | 11/2007 | Lee et al. |
| 2007/0271229 A1 | 11/2007 | Ho et al. |
| 2008/0155384 A1 | 6/2008 | Golub et al. |

FOREIGN PATENT DOCUMENTS

| | | |
|---|---|---|
| JP | H01233510 | 9/1989 |
| JP | 2005267025 | 9/2005 |

OTHER PUBLICATIONS

English Abstract of JP 2005267025.
English Abstract of JP H01233510.
English Language Translation of JP 2005-267025 (The English Language Abstract was previously cited in an Information Disclosure Statement submitted on Feb. 8, 2016).

*Primary Examiner* — Bhavesh V Amin
(74) *Attorney, Agent, or Firm* — Dykema Gossett PLLC

(57) ABSTRACT

A method for processing data with parameters of a vehicle, power train or power train component of different origin comprises reading out of the data and the carrying out a statistical analysis for determining the minimum and maximum axis values of the data associated with the same parameters. Subsequently, the data is converted and compressed into a common format, and the data associated with the same parameters is provided with common axes and the same number of sampling points, wherein the start and end figures of the axes results from the minimum and maximum axis figures. The data processed in this way may then be subjected to further processing.

11 Claims, 2 Drawing Sheets

METHOD FOR PROCESSING DATA

Figure 1C:
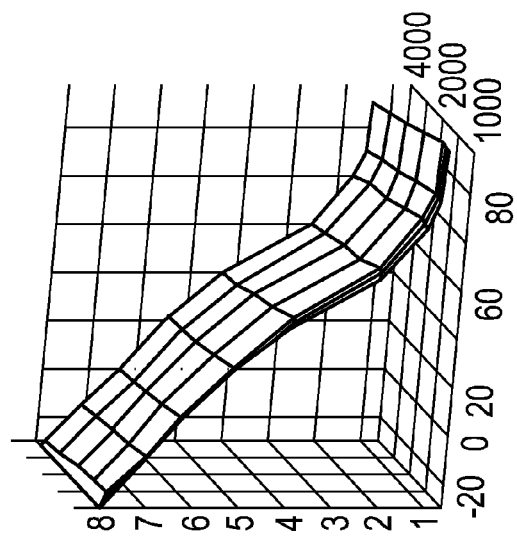

The invention relates to a method for processing data with parameters of a vehicle, a power train or a power train component of different origin, comprising reading out of data obtained from earlier calibrations of vehicles, power trains or power train components from a data base.

During test runs of vehicles or their subsystems, an enormous amount of calibration data is generated, which however is currently stored completely independently from each other and is not correlated to each other. Therefore, any knowledge indirectly stored in these historic data inventories cannot be utilised.

Examples of so-called "data mining" for evaluating historic data include extraction/ranking whilst searching using search engines, classification in spam filters, the shopping basket analysis in online warehouses, but also the remedy of defects in the event of damages in the case of vehicle manufacturers.

The problems in connection with "data mining" especially in the area of calibration data, e.g. for the development or calibration of an engine control unit of an internal combustion engine, a vehicle, a power train or a power train component, will become clear from the following example:

A data inventory contains between 15,000 and 30,000 different labels (parameters). For each development project, there are approx. 100 data inventories for each variant (structure) of vehicle/engine/transmission. If in addition even the temporal dependency is taken into account, then this amounts, in a single project running over 2 years, to a number of approx. 300 million labels (30,000 labels*100 variants*50 weeks*2 years).

The calibration of a vehicle, power train or power train component generally means that all the engine parameters, control parameters, body parameters, power train parameters, control device parameters etc., which may also influence each other, are configured in such a way that the vehicle, power train or power train component runs without any problems. Calibration also means that the internal combustion engine is adjusted in such a way, in particular by means of control parameters in the motor control unit, that combustion takes place in an optimal manner and the emission values correspond to a legal guideline. For example, a new engine coming from the conveyor belt must be controlled by means of a control unit, i.e. ignition timing, amounts of fuel injection, injection angle etc. have to be optimally tuned to each other, so that no damage is caused to the engine and yet the maximum possible energy is achieved with minimum emission values. Calibration also means that the driving experience that is desired for this vehicle is generated. Calibration also means that the response behaviour of the vehicle, the power train or a power train component, which means, for example, when the driver actuates the accelerator or the brake pedal, is well balanced. This also gives an idea about the amount of parameters and associated data that is generated in the course of such a calibration.

Conventional comparisons or evaluations fail because of the enormous amount of data, lacking visualisation and a lack of efficient comparisons. The algorithms (>200) currently available for "data mining" fail because of characteristic curves (2D) and/or characteristic maps (3D), which form an essential part especially of calibration data.

It is therefore the object of the present invention to extract technically relevant knowledge from data with parameters of a vehicle, a power train or a power train component of any origin and in any format, and to provide it for further use.

In order to achieve this object, the method as described in the beginning has been improved in such a way that first a statistical analysis for determining the minimum and maximum axis figures of the data associated with the same parameters is carried out, subsequently the data is converted into a common format and is compressed, the data associated with the same parameters is provided with the same axes and the same number of sampling points, wherein the start and end figures of the axes result from the determined minimum and maximum axis figures, and the data converted in this way is used as a basis for subsequent processing. Thus, any advantageous correlation between parameters of the data can be shown, a preliminary dating of new projects can be carried out on the basis of historic information, clustering or grouping of parameters can be carried out (label A always has the same figures in variants A, B, C), there is the possibility for time-series analyses (statements about time, complexity and quality of a data inventory), for plausibility check and/or error detection (is the value of a parameter plausible in the light of historical data inventories), but also calibration process optimisation by uncovering weaknesses in the process can be carried out.

In order to make the parameter data comparable, any data associated with the same parameters is provided with common axes and the same number of sampling points. As a result, and in embodiments which are improved even further as explained below, the comparison can be carried out independently of type/unit/axis of the parameters of the data in a less complex and more rapid way.

Preferably, the data is normalised in this respect in relation to the axes, advantageously by establishing a number of sampling points for the axes and to distribute this number of sampling points in an equal manner over the axis area.

A further advantageous embodiment variant provides for shifting the minimum of the respective, preferably normalised data to the zero line.

In doing so, a further simplification and thus more rapid processing can be achieved in such a way that the data is scaled to a predetermined range, preferably from zero to $2^{32}-2$.

As a result of the further optional feature that the data is transferred into a number system to the base 64, savings in necessary memory space are achieved.

A further advantageous embodiment of the invention is characterised in that the normalised data is recorded together with a checksum, as a result of which a more rapid comparison is made possible.

A further optional possibility provides for determining a degree of maturity for a parameter. As a result, different analyses can be carried out using the degree of maturity. For example, parameters with a too low degree of maturity can be filtered out. Or the temporal development of the degrees of maturity can be analysed. Also, an overall degree of maturity can be determined for a group of parameters. Thus, both a data reduction and an increase in the quality of the data can be achieved.

In the description given below, the invention will be explained in more detail by means of the attached drawings and by means of the example of calibration data.

Figure 1B:
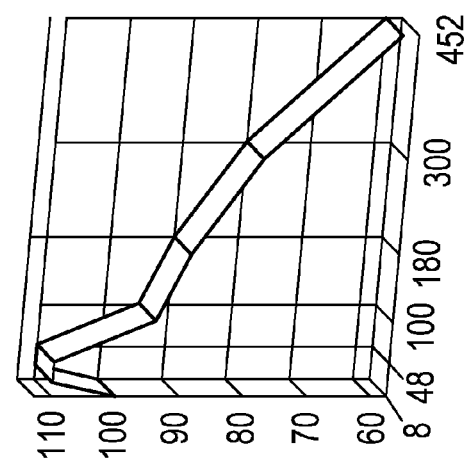
Figure 1A:
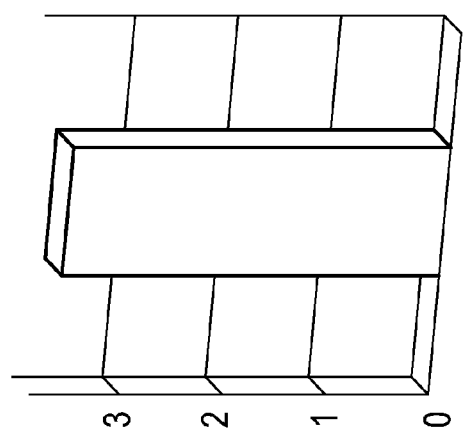
Figure 2A:
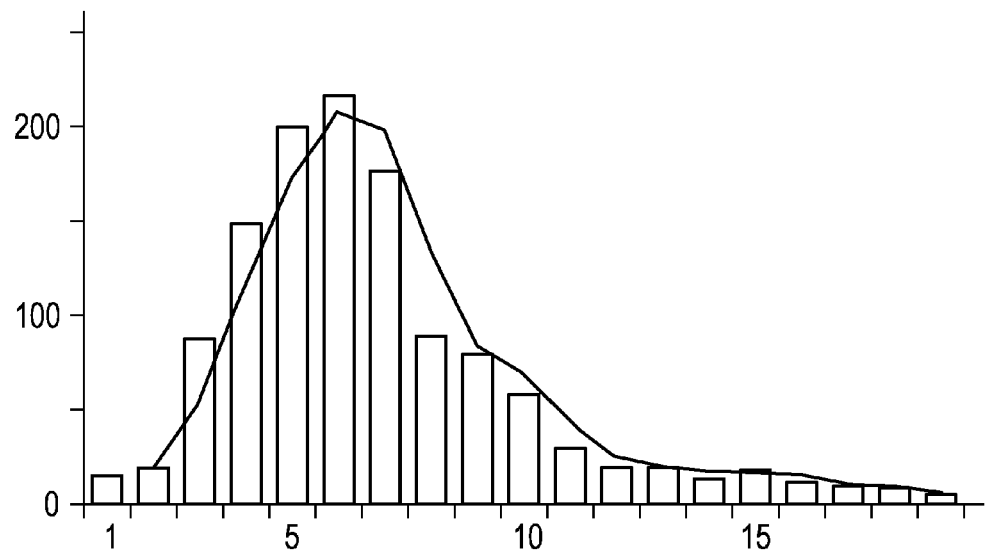
Figure 2B:
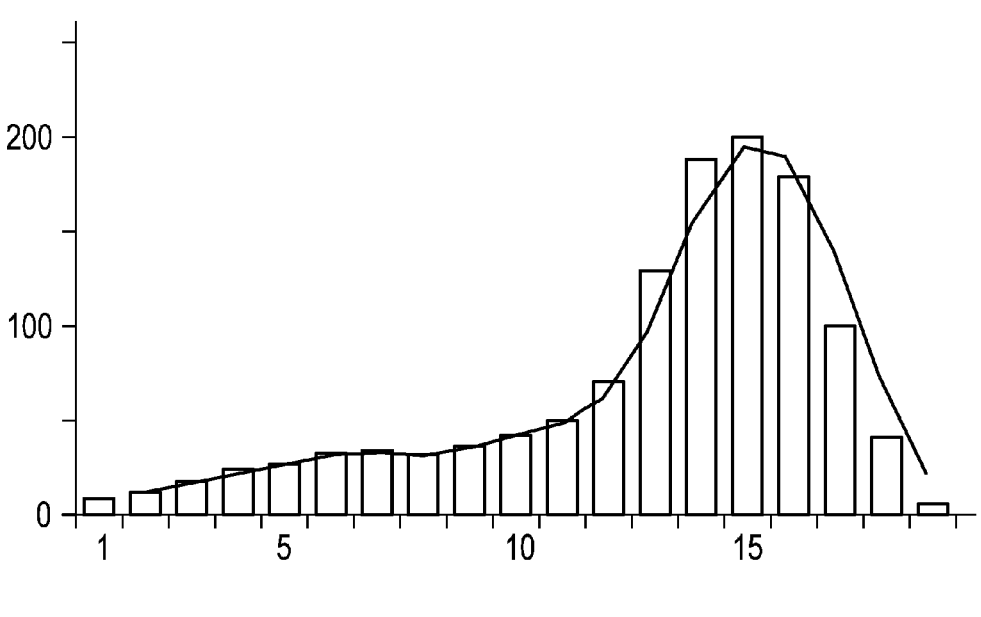

FIGS. 1a to 1c show, by way of example, one-, two- and three-dimensional calibration data, and FIGS. 2a and 2b show two diagrams for clarifying statements in relation to the quality of calibration data on the basis of changes over time.

From a large amount of calibration data, which is shown in an exemplary manner in FIGS. 1a to 1c and which may be present in different dimensionality, information is to be obtained in a manner as simple as possible and is to be used for current data inventories. A conventional comparison is often not possible because it would be too time-consuming and the calibration data could moreover differ with regard to dimension, axis figures, number of sampling points and units. Therefore, in a first step, the calibration data consisting of a description file and a data part is read out only from the database, is read into the system according to the invention and a basic statistical analysis is carried out. Usually, data of an engine control device are stored in the form of a data file (hex file) and a description file (A21 file). These files contain all the relevant information about the parameter present in the form of a characteristic map or a characteristic curve. The description file is used as a description for the data file and these two will always form a pair. Therefore, during the analysis of calibration data, both the description file and the data file will be read from the database. In the case of other data, it may be sufficient to read in a data file.

The statistical analysis comprises at least one minimum/maximum analysis and the determination of a "degree of maturity" on the basis of certain markers. The degree of maturity for a parameter (label) is established here by the user, e.g. from experience or on the basis of the state of the project. The degree of maturity can for example be indicated as a value between zero and one or as a percentage. Common are e.g. steps of 0, 25, 50 or 100% degree of maturity. From these degrees of maturity, an overall degree of maturity for a group of labels can be determined, e.g. by adding the individual degrees of maturity of the associated labels together.

Subsequently, a conversion and compression of the data part of the calibration data into a common format is carried out in a next step. To this end, the same parameters are provided with common axes and the same number of sampling points. The same parameters may, in different data inventories, have different axes and numbers of sampling points. For example, a label A in data inventory 1.0 has an axis from 0-1000 and 8 sampling points, and the same label A in data inventory 1.1 has an axis of 50-909 and 17 sampling points. Additional sampling points may be obtained for example by way of interpolation. In this process, the start and/or end figure(s) for the axes can be obtained from the minimum or maximum axis figures of the same label, as obtained from the statistical analysis. The number of sampling points may advantageously be statically set to a certain value, e.g. 25. After that, the parameter values are normalised to match the new axes. To this end, the set number of sampling points can be equally distributed over the axis area (minimum and maximum axis figures). As a result of this processing, a relevant comparison is now possible for the first time, which is independent from the original axes, types and/or units.

Since it is usually an enormously large amount of data that has to be dealt with, according to an advantageous development of the invention, this data is processed even further prior to being inserted into the database, in order to save memory space. First, the values are shifted in such a way that the minimum is exactly on the zero point and only positive values have to be dealt with. Finally, scaling of the parameter values is carried out, so that only integers of 0 to $2^{32}-2$ are present. To this end, for example a factor by which the parameters values are multiplied is established, in order to arrive at the integers.

Preferably, a checksum (e.g. CRC32) is also established via the normalised and scaled values of each parameter. This unique checksum allows the examination of the equality of two characteristic maps (3D) or characteristic curves (2D) with just one single command, it also allows the values to be clustered.

In this respect, a further step may be provided of transferring these integers into their own number system, which will be described in more detail below. First of all, it should still be mentioned that in the case of the parameter data, there are some characteristic curves (2D) and/or characteristic maps (3D), which always have the same value. This would be a straight line or a flat surface. In this case, only a single z value will be stored, because this always repeats itself which allows unnecessary memory usage to be avoided.

What also contributes to less memory use is the conversion of the data into a number system, which compared to the decimal system has a larger number of characters, preferably 64 characters. Such number systems need, compared to the decimal system, less memory because larger numbers can be represented using fewer characters. Preferably, 64 is chosen as the base, because the transformation between the decimal system and the number system with a base $2^n$ can be carried out with rapid bit shifting operations (see table 1).

TABLE 1

| Value | Character |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | A |
| 11 | B |
| 12 | C |
| 13 | D |
| 14 | E |
| 15 | F |
| 16 | G |
| 17 | H |
| 18 | I |
| 19 | J |
| 20 | K |
| 21 | L |
| 22 | M |
| 23 | N |
| 24 | O |
| 25 | P |
| 26 | Q |
| 27 | R |
| 28 | S |
| 29 | T |
| 30 | U |
| 31 | V |
| 32 | W |
| 33 | X |
| 34 | Y |
| 35 | Z |
| 36 | a |
| 37 | b |
| 38 | c |
| 39 | d |
| 40 | e |
| 41 | f |
| 42 | g |
| 43 | h |
| 44 | i |
| 45 | j |
| 46 | k |
| 47 | l |

TABLE 1-continued

| Value | Character |
|---|---|
| 48 | m |
| 49 | n |
| 50 | o |
| 51 | p |
| 52 | q |
| 53 | r |
| 54 | s |
| 55 | t |
| 56 | u |
| 57 | v |
| 58 | w |
| 59 | x |
| 60 | y |
| 61 | z |
| 62 | ( |
| 63 | ) |

The converted and compressed data is preferably centrally stored in a "data warehouse" and allows the rapid generation of complex analyses. An example of this is explained in FIGS. 2a and 2b. In FIG. 2a, the frequency and/or the extent of changes to the calibration data is plotted over time. It can be seen that after an introductory phase of the respective project, massive changes take place in the early phases, until finally, towards the end of the project, only minor adaptations take place, i.e. "fine tuning". This means, if during an analysis of calibration data a diagram as shown in FIG. 2b is obtained which shows an exactly opposite course of changes, it can be concluded that the project has run poorly and/or that erroneous data is present.

In order to reduce the amount of data and to improve the quality of data, the degree of maturity of each label is used. The degree of maturity is indicated for each label and is between 0% (initial) and 100% (final). When establishing the "data warehouse" as already addressed above, a type of filtering may take place, in which only those labels are used that have a degree of >n %. Also a weighting using the degree of maturity can be carried out. In this process, for example during the compilation of a report or an evaluation, preferential treatment will be given to those labels that have a higher degree of maturity.

In order to detect outliers and to represent the distribution function (see figure: normal distribution curve), those labels with a score=0% will not be taken into account.

The invention claimed is:

1. A method for calibration or development of a vehicle, a power train, a power train component, or an engine control unit of an internal combustion engine, the method comprising:

obtaining calibration data from previous calibrations of other vehicles, power trains, power train components, or control units of internal combustion engines, from a database, carrying out a statistical analysis for determining the minimum and maximum axis figures of the calibration data associated with the same parameters of the other vehicles, power trains, power train components, or control units of internal combustion engines, converting and compressing the calibration data obtained from earlier calibrations of the other vehicles, power trains, power train components, or engine control units of internal combustion engines into a common format, providing the calibration data associated with the same parameters of the other vehicles, power trains, power train components, or engine control units of the internal combustion engine with common axes and the same number of sampling points, wherein the start and end figures of the axes result from the minimum and maximum axis figures, and using the calibration data thus converted as a basis for subsequent processing for the calibration or development of the vehicle, power train, power train component, or engine control unit of the internal combustion engine.

2. The method as claimed in claim 1, wherein the calibration data is normalised in relation to the axes thereof.

3. The method as claimed in claim 2, wherein a number of sampling points for the axes is established and this number of sampling points is equally distributed over the axis area.

4. The method as claimed in claim 1, wherein the minimum of the respective calibration data is shifted onto the zero line.

5. The method as claimed in claim 4, wherein the calibration data is scaled onto a set range of preferably zero to $2^{32}-2$.

6. The method as claimed in claim 5, wherein the calibration data is transferred into a number system with a base 64.

7. The method as claimed in claim 2, wherein the normalised calibration data is stored together with a checksum.

8. The method as claimed in claim 1, wherein a degree of maturity is determined for a parameter.

9. The method as claimed in claim 8, wherein parameters with a degree of maturity below a certain limit are filtered out.

10. The method as claimed in claim 1, wherein the converted calibration data is used for calibrating a vehicle, power train or power train component.

11. The method as claimed in claim 1, wherein the converted calibration data is used for evaluating the calibration data obtained from the previous calibrations.

* * * * *